UNITED STATES PATENT OFFICE.

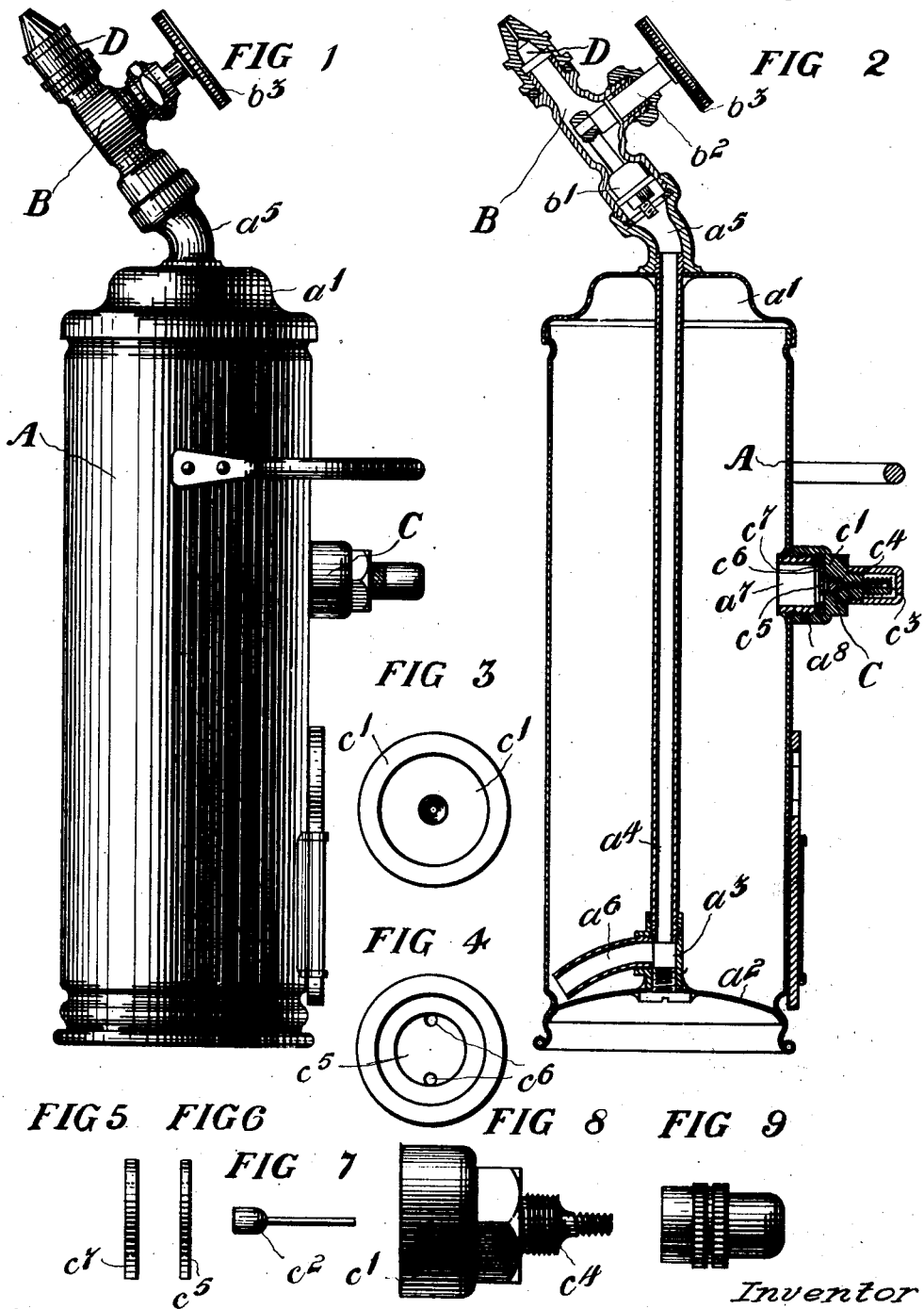

HENRY THOMAS BLAKE, OF ROSS, ENGLAND.

FIRE-EXTINGUISHER AND OTHER AIR-PRESSURE LIQUID-EJECTING VESSEL.

No. 931,255.     Specification of Letters Patent.     Patented Aug. 17, 1909.

Application filed March 15, 1909. Serial No. 483,559.

*To all whom it may concern:*

Be it known that I, HENRY THOMAS BLAKE, a citizen of Great Britain, and a resident of 44 Broad street, Ross, in the county of Hereford, England, have invented certain new and useful Improvements in Fire-Extinguishers and other Air-Pressure Liquid-Ejecting Vessels, of which the following is a specification.

The invention more particularly has for its object to render the charging of such vessels more convenient and also to enable the entire liquid contents of the vessel to be effectively discharged.

The features of novelty of the invention, and the method of carrying same into effect will be more particularly set forth in the description of the accompanying drawings and in the appended claims.

On the drawings: Figure 1. is an external elevation of a liquid discharging vessel constructed in accordance with the invention. Fig. 2. is a complete sectional elevation of same. Fig. 3. is an internal end view of the valve showing valve plunger seating. Fig. 4. is a similar view but showing the valve disk in place over the plunger seating. Figs. 5, 6, and 7. are details of the valve disk, locking ring and valve plunger. Fig. 8. is an internal view of the main body of valve, and Fig. 9 an external view of suitable cap.

The vessel A is shown of cylindrical shape and is equipped with a truncated conoidal cap $a^1$ which is fluted annularly. The vessel is provided with a convex bottom $a^2$ with the convexity toward the interior. From the center of the bottom $a^2$ a socket piece $a^3$ is securely carried and into this a vertical discharge pipe $a^4$ is screwed. The pipe $a^4$ passes up through the center of the cap $a^1$ and screws into a small elbow pipe $a^5$ which receives a tap B. The joints of the pipe through the vessel are suitably sealed and the pipe acts as a strengthening stay to the vessel. The entry to the pipe $a^4$ from the interior of the vessel A is made by a curved pipe $a^6$ whose extremity is closely adjacent to the lowest part of the vessel A formed by the convexity of the bottom $a^2$.

The inlet $a^7$ through which water or other chemical solution is charged into the vessel is arranged up the side of the vessel at a height to leave the relative proportions when fully charged of about ⅔ water space to ⅓ air space. This is found when a working pressure of 65 to 75 lbs. is employed, to allow for the complete discharge of the water as an effective jet or spray. At this inlet $a^7$ a short threaded sleeve $a^8$ is secured and onto this the main body part $c^1$ of an air valve C is screwed. The screw thus serving for a cap over the water inlet $a^7$ also serves as a securing part of the air inlet valve thus making a compact fitting.

The valve is formed by a plunger $c^2$ having a pin working in the inlet $c^3$ in the threaded part $c^4$ of the body. The plunger seats in a recess in the body part of the valve and the air pressure in the vessel forces the plunger tightly against its seat in the recess. At the back of the plunger the body $c^1$ is faced to form a seat for a disk $c^5$; this disk covers the plunger recess and has perforations $c^6$ out of alinement therewith as shown at Figs. 2 and 4.

Pressure of air through the water inlet $c^8$ forces back the plunger away from its seat and also eases the pressure of the disk $c^5$ so that the air passes through the perforations $c^6$. Air pressure in the vessel acts in the reverse way pressing the disk and plunger against their seats so that a double valve action is obtained. The valve disk $c^5$ is secured in place by a washer $c^7$. The vessel by this valve is adapted for charging by a cycle or like inflator and by the formation of the threaded parts $c^4$ of the valve in the manner shown, the smaller part serves for making connection with the nipple of a cycle inflator and the second or larger part serves for a motor tire inflator.

The tap B made use of is of the known type in which the pressure in the vessel assists the closing action of the tap. A plunger $b^1$ is drawn up against its seating by a crank or eccentric connected with the spindle $b^2$ of a hand wheel or part $b^3$. This tap is convenient to operate, being quick in its action and owing to the pressure closing the valve no leakage occurs.

The drawing shows the discharge tap equipped with a nozzle D suitable for fire extinguishing purposes but for other purposes a rose or sprayer or similar arrangement may be adopted.

This apparatus forms a simple and handy apparatus for use in outbreaks of fire or for tree spraying or similar uses; it is readily charged and re-charged without expense and will retain practically its full pressure for some time when desired.

What I claim then is:—

1. An apparatus of the class described comprising in combination, a vessel provided with a convex bottom projecting upwardly therein, a top for said vessel, a pipe extending through the top of said vessel, a fitting forming an outlet for said pipe and connected therewith and with the vessel, means closing the lower end of said pipe and rigidly securing it to the convex bottom causing said pipe to act as a strengthening stay for said vessel, said fitting being provided with an extension forming an inlet for said pipe and projecting to the lowest portion of said vessel, and means for charging said vessel.

2. An apparatus of the class described comprising in combination, a vessel provided with a top and bottom, a pipe fixed to the top of said vessel and provided with an outlet, means securing said pipe to the bottom of said vessel and provided with an inlet communicating with said pipe and projecting to the lower portion of the vessel, said pipe serving as a strengthening stay for said vessel, and a water inlet and valve at the side of said vessel located with regard to the dimensions thereof in a position to proportion the air and liquid space so as to insure effective discharge of all the liquid.

Signed at Ross, in the county of Hereford, England, this 27th day of February, A. D. 1909.

HENRY THOMAS BLAKE.

Witnesses:
 THOS. H. COOMBES,
 CHARLES J. BLAKE.